(12) United States Patent
Jørgensen et al.

(10) Patent No.: US 12,230,164 B2
(45) Date of Patent: Feb. 18, 2025

(54) COMPUTER IMPLEMENTED METHOD AND APPARATUS FOR TRAINING AN OPERATOR OF A VIDEO MANAGEMENT SYSTEM

(71) Applicant: Milestone Systems A/S, Broendby (DK)

(72) Inventors: Dennis Schou Jørgensen, Ballerup (DK); Hans Kierulff, Hørsholm (DK)

(73) Assignee: Milestone Systems A/S, Broendby (DK)

( * ) Notice: Subject to any disclaimer, the term of this patent is extended or adjusted under 35 U.S.C. 154(b) by 869 days.

(21) Appl. No.: 17/373,579

(22) Filed: Jul. 12, 2021

(65) Prior Publication Data
US 2023/0008871 A1    Jan. 12, 2023

(51) Int. Cl.
G09B 9/00 (2006.01)
G06T 15/10 (2011.01)
G06T 15/50 (2011.01)

(52) U.S. Cl.
CPC ............. *G09B 9/00* (2013.01); *G06T 15/10* (2013.01); *G06T 15/50* (2013.01)

(58) Field of Classification Search
CPC ..................................................... G09B 9/00
See application file for complete search history.

(56) References Cited

U.S. PATENT DOCUMENTS

| | | | |
|---|---|---|---|
| 10,609,334 B2* | 3/2020 | Li | G06V 40/161 |
| 11,409,411 B1* | 8/2022 | Levin | G06F 3/04845 |
| 2012/0314018 A1* | 12/2012 | Wengrovitz | H04N 7/181 |
| | | | 348/E7.083 |
| 2018/0292895 A1* | 10/2018 | Schluessler | G06F 3/013 |
| 2020/0336719 A1* | 10/2020 | Morisawa | H04N 13/239 |

FOREIGN PATENT DOCUMENTS

CN    111862712 A    10/2020

OTHER PUBLICATIONS

Stephan R. Richter, et al., Enhancing Photorealism Enhancement, arXiv, May 10, 2021, pp. 1-16, https://arxiv.org/abs/2105.04619.

* cited by examiner

*Primary Examiner* — Omkar A Deodhar
*Assistant Examiner* — Shauna-Kay Hall
(74) *Attorney, Agent, or Firm* — Canon U.S.A., Inc. IP Division

(57) ABSTRACT

A computer implemented method of training an operator of a video management system, the method comprising inputting, into the video management system, a plurality of virtual video streams generated by virtual video cameras within a dynamic 3D virtual environment; displaying on a display, from the virtual management system, at least some of the said virtual video streams, wherein at least one output video stream shows an event of interest; receiving, in the computer, at least one command from the operator indicative of a detection of the event of interest in the dynamic 3D virtual environment by the operator.

19 Claims, 2 Drawing Sheets

COMPUTER IMPLEMENTED METHOD AND APPARATUS FOR TRAINING AN OPERATOR OF A VIDEO MANAGEMENT SYSTEM

BACKGROUND

Field of the Disclosure

The present disclosure relates to a computer implemented method, a computer program, and an apparatus for training an operator of a video management system (VMS).

Description of the Related Art

A video surveillance management system typically receives video data from a plurality of surveillance cameras. The video surveillance management system may store the data in a recording server and carry out image processing or analytics, and transmit the video data to a client device which may be a mobile device or an operator console including a display where it is viewed by an operator. The video surveillance management system may also carry out control relating to the storage and deletion of the video data.

The video surveillance management system may also receive commands from the user, from the client device. The commands may include commands to remotely control video cameras connected to the video surveillance management system such as pan-tilt-zoom (PTZ) video cameras. The commands may also include commands to the video management system which control which data is sent to the client device for display. For example, the operator can control which video cameras' data is sent from the video management system to the display so that the operator can select which video cameras to view data from.

The operator's display may display only data from one video camera at any one time. However, video data from multiple cameras may be displayed simultaneously in multiple windows of an interface (e.g. in multiple panes or child windows inside a parent window), with video from a selected camera preferably displayed in a relatively larger view than the other cameras. Accordingly, the client device can receive one stream of video data or multiple streams.

Developing and testing video-based software for the surveillance industry has become increasingly difficult due to legal restrictions imposed on video source material. For instance, the use of Closed Circuit Television (CCTV) videos and data may be restricted by federal and/or state rules, local regulations and other privacy considerations, which has the ultimate effect of limiting the number and variety of usable video footage that can depict scenarios including people and property. Restrictions on where and when video-feeds can be obtained prevents creation of video material for specific situations altogether.

Since legal limitations prevent using, storing, and distributing video material showing people and personal property, the development of new software is often restricted to the use of older and inadequate video material. As a result, developing and testing new video surveillance functionality with a high level of complexity involving people, people's behaviour and properties like cars, housing etc., is suffering.

Training people to efficiently configure a VMS for a concrete environment (for example a warehouse) with its often limited opportunities for optimal placing of cameras and other devices, is also limited in training classes, including on-line training classes, when there is no environment—with all its physical challenges—to work on.

Likewise, it is difficult if not impossible to train VMS operators to act appropriately in atypic situations as in situations or scenarios involving alarms and catastrophes, in the absence of suitable video material.

Configurators and operators are generally trained using fixed video feeds, which repeat the same situations and offer no option to interact, like controlling a resolution, field of view, pan, tilt and/or zoom of a video camera.

The combination of a 3D game engine with picture quality rendering capabilities and real-life looking 3D models of people and property can provide visual outputs that are very close to or better than visuals from real-life video surveillance cameras. By leveraging the means of moving objects around and animating 3D human models the need for video feeds with human diversity, behavior and property can be fulfilled. Video feeds with high complexity (many people, moving vehicles, detailed buildings etc.) can be depicted and source the needed video requirements for the development and testing of new surveillance systems.

A training system based on a Virtual Reality VR environment is known from Chinese Patent Publication No. CN111862712A. In this prior art, an operator is able to control a virtual video camera mounted on a drone which follows a preset route in a 3D environment. The VR training scene includes an accidental event scene such as a high-rise fire scene, a volcanic eruption scene and/or a sink scene of a cruise ship. However, this document does not consider a situation where the operator is monitoring a surveillance area through a VMS which outputs several virtual video streams on a display, and where the virtual video cameras do not follow a preset route. There is thus a need to improve the training of VMS operators, which is not covered by this document.

BRIEF SUMMARY

The present disclosure addresses at least some of these issues.

According to the present disclosure, the creation of virtual environments which provide real-time video footages of virtual people and virtual property eliminate the problem. By generating live video-feeds from within a dynamic 3D virtual environment the further development and testing of video surveillance software can evolve with new and complex video source material. The solution is to create virtual video cameras that provide live video feeds from inside the virtual environment to the video management system in the real-world. Each virtual video camera may record what is in front of it by its location, rotation and field-of-view, just like a real-world video camera. Each video feed can be received from outside the virtual environment as if the video is recorded by genuine video cameras in the real world. From a video management system perspective, the video received from the virtual environment is not distinctly different from the video of a regular video surveillance camera.

The present disclosure provides a computer implemented method of training an operator of a video management system, the method comprising inputting, into the video management system, a plurality of virtual video streams generated by virtual video cameras within a dynamic 3D virtual environment; displaying on a display, from the virtual management system, at least some of the said virtual video streams, wherein at least one output video stream shows an event of interest; receiving, in the computer, at least one command from the operator indicative of a detection of the event of interest in the dynamic 3D virtual environment by the operator.

The present disclosure also provides a non-transitory computer readable storage medium storing a program for causing a computer to execute a computer implemented method of training an operator of a video management system, the method comprising inputting, into the video management system, a plurality of virtual video streams generated by virtual video cameras within a dynamic 3D virtual environment; displaying on a display, from the virtual management system, at least some of the said virtual video streams, wherein at least one output video stream shows an event of interest; receiving, in the computer, at least one command from the operator indicative of a detection of the event of interest in the dynamic 3D virtual environment by the operator.

The present disclosure also provides an apparatus for training an operator of a video management system, comprising a display, a video management system and a computer having at least one processor configured to input, into the video management system, a plurality of virtual video streams generated by virtual video cameras within a dynamic 3D virtual environment; display on a display, from the virtual management system, at least some of the said virtual video streams, wherein at least one output video stream shows an event of interest; receive, in the computer, at least one command from the operator indicative of a detection of the event of interest in the dynamic 3D virtual environment by the operator.

Additional features of the present invention will become apparent from the following description of embodiments with reference to the attached drawings.

BRIEF DESCRIPTION OF THE DRAWINGS

Embodiments of the present disclosure will now be described, by way of example only, with reference to the accompanying drawings in which.

DETAILED DESCRIPTION

Figure 1:
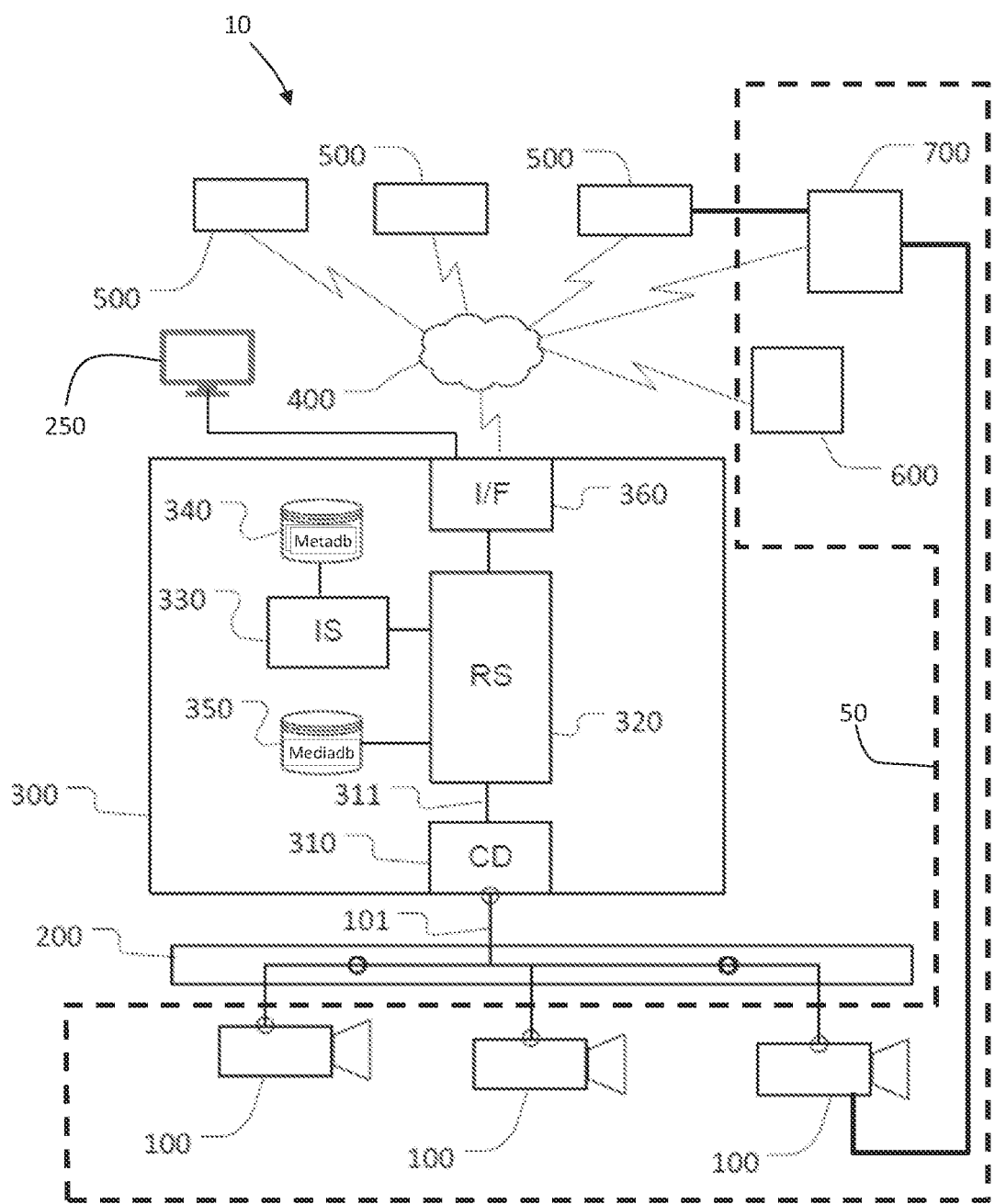
FIG. 1 illustrates a video system according to one or more aspects of the present disclosure.

FIG. 1 schematically illustrates an example of a video system.

The video system 10 comprises a dynamic 3D virtual environment 50 which comprises a number of virtual video cameras 100, a video management system 300, a display 250 and a number of peripheral devices 500, 600, 700 (here, physical peripheral devices 500 and virtual peripheral devices 600, 700). In the example of FIG. 1 the peripheral devices 500, 600, 700 are shown as being remote from the video management system 300, in particular as being executed by a data processing system remote from the video management data processing system on which the video management system is executed. In particular, embodiments are described where the peripheral devices are cloud-based or simulated. It will be appreciated, however, that in some embodiments, one or more, or even all, peripheral devices may be integrated into the video management system or otherwise executed on the same data processing system as the video management system. Optionally, the video system 10 may comprise additional components, such as a video analytics system and/or other video-receiving systems. These may be implemented on a data processing system remote from the video management system, as illustrated in FIG. 1, or they may be executed on the same data processing system as the video management system.

The number of virtual video streams displayed on the operator's display 250 may vary upon selection of a video stream by the operator. For instance, video streams may initially be presented to the operator in a 3×3 or 4×4 grid view. Upon selection of a video stream by the operator in a 3×3 grid view, the four lower screens may be converted into a single screen showing the selected video stream, and the remaining 5 screens may be used (in full or in part) to show relevant video streams from the video stream or new video stream recommendation. Note that the choice of the layout (3×3, 4×4 etc.) may depend on the size of the operator's display. The operator may also have multiple screens, and each video stream might appear on a different screen, in a full screen view.

While FIG. 1 illustrates a system with three virtual video cameras, it will be appreciated that other examples may include fewer than three or more than three virtual video cameras. Thus, a dynamic 3D virtual environment 50 may include tens or even hundreds of virtual video cameras. The virtual video cameras are advantageously distributed across an area where surveillance or monitoring is desired e.g. across the premises of a building such as a virtual hospital or virtual shopping mall. The number and positions of virtual video cameras as well as the types of virtual video cameras to be installed may be selected based on factors such as the level of surveillance desired, the size of the facility and/or the complexity of the layout of the facility. It will be appreciated that the present disclosure is not limited to a closed or indoor environment or facility but also applies to open environments such as outdoor environments. Examples of closed environment include indoor spaces inside airports, busses, airplanes, manufacturing plants, nuclear power plants, schools, hospitals, prisons, shopping malls, office spaces and the like. Examples of open environments include freeways, intersections, outdoor car parks, streets, recreational parks, and the like. It will be appreciated that some environments may include closed and open areas, and that some of these areas may not always be clearly defined by boundaries such as walls, doors, barriers, and the like.

Although the present disclosure particularly relates to the field of video surveillance, other typical purposes for monitoring video streams may be documentation, medical observation, building management, production, traffic control and/or process control.

The virtual video cameras may correspond to simulations of conventional video cameras known as such in the art of video surveillance. It will be appreciated that the dynamic 3D virtual environment 50 may include a plurality of virtual video cameras of the same type, i.e. virtual video cameras having the same capabilities, providing the same type of video output, in the same format etc. Alternatively, the dynamic 3D virtual environment 50 may include cameras of different types, e.g. virtual video cameras having different capabilities, providing video streams of different resolution, in different formats or outputting additional metadata associated with the video. Examples of capabilities of virtual video cameras may include one or more of the following: audio recording, video recording in visible wavelength ranges and/or in infrared wavelength ranges, such as near-infrared wavelength ranges, control functions such as pan, tilt or zoom, image processing capabilities, motion detection, etc.

The virtual video cameras 100 are communicatively connected to the video management system 300. To this end, the virtual video cameras 100 may be connected to the video management system via a local area network 200 or in a different suitable manner, e.g. via simulated point-to-point wired and/or wireless connections, or the like. For example, the virtual video cameras may be connected to the video management system via a simulated Ethernet connection. An example of a simulated wireless connection includes a 5G network.

Within the context of the present disclosure, the term "peripheral devices" (whether virtual or physical) should be understood as comprising devices for generating signals and/or data, such as monitoring signals and/or data streams. Typical peripheral devices which may be used or simulated include audio recording equipment, or the like, traditional measurement or sensing devices, such as sensors for biological, chemical, or physical quantities/parameters, electrical, magnetic or optical sensors, temperature or wind sensors, light detecting sensors, motion detecting sensors such as passive infrared (PIR) sensors, sensors which use microwave or ultrasonic pulses, or vibration sensors, biometric sensors or systems, access control and alarm equipment or systems, virtual door access control equipment or systems, and production process parameter sensors. The present disclosure is not limited to any particular types of peripheral devices. Preferably, the peripheral devices comprise a combination of devices such as access control and alarm equipment or systems or virtual door access control equipment or systems. In the example of FIG. 1, the dynamic 3D virtual environment 50 includes, a virtual loudspeaker 600 and a virtual door access control equipment 700. As can be seen on FIG. 1, the virtual door access control equipment 700 is virtually directly connected to a virtual video camera 100. In this way, the virtual video stream generated by this video camera is input into the virtual door access control equipment 700, which may in turn restrict or allow access to a virtual person in a part or area of the dynamic 3D virtual environment based on a recognition functionality embedded in the virtual door access control equipment 700. For instance, the virtual door access control equipment 700 may be configured to detect a virtual tag attached to or worn by a virtual person. This configuration may allow to detect events of interest more easily, for instance, in this example, someone trying to access a restricted area. Alternatively, the virtual door access control equipment 700 may activate a virtual video camera upon detection of such a virtual tag and/or change a field of view, pan, tilt, zoom and/or resolution setting of at least one virtual camera which observes the virtual peripheral device 700 in the dynamic 3D virtual environment. In this way, the operator may get a better or different view of the scene comprising the virtual peripheral device 700 and/or of the virtual person accessing the virtual peripheral device 700. According to another alternative, the virtual peripheral device 700 may stop the recording of a virtual video camera upon detection of such a virtual tag. It will also be appreciated that the virtual video stream can be input in a different type of virtual peripheral device, such as for instance a simulated virtual broadcasting device, which in turn broadcasts the virtual video stream to the video management system. The virtual data stream or signal generated by the virtual peripheral device within the dynamic 3D virtual environment may then be input into the video management system, which may in turn output on the display at least one virtual data stream and/or at least one alert, alarm and/or message based on the virtual data stream. The virtual data stream output on the display may for instance be a compressed video stream of the virtual video stream input into the virtual peripheral device, which in this case is a virtual video compressor. As another example, the virtual peripheral device may be any other type of video editing or video filtering device. It will be appreciated that the output from the virtual peripheral device may also be an alert, alarm and/or message, for instance a notification that the virtual video stream generated by the virtual video camera input into the virtual peripheral device contains an event of interest, detected by the virtual peripheral device. For instance, the virtual peripheral device may be a device configured to count people in a room and to send a signal to the video management system when the room's capacity has been reached, which in turn causes the computer to display an alert on the display and emit a sound (or any other kind of appropriate alarm). In the above-mentioned examples, it may be advantageous to receive a command from the operator indicative of an instruction to turn off the at least one alert, alarm and/or message output from the virtual management system. This makes it possible to evaluate if the operator reacts appropriately or if the operator reacts at all in case of a false alarm corresponding to the event of interest (if, for example, they have interrupted a fire alarm in the presence of a fire) while they should have done something else.

It will be appreciated that some examples of video systems may include virtual peripheral devices 600, 700 configured to operate without any video input, such as sensors providing sensor signals and/or media streams different from video streams, such as audio signals, radar signals, Lidar signals, etc., as described above.

Note that the virtual peripheral devices 600, 700 do not need to be connected or to communicate with each other and can be connected to the video management system via a communications network 400 described below with reference to FIG. 1. The communications network 400 may be the Internet or another suitable communications network. Alternatively, some or all of the virtual peripheral devices 600 may communicate with each other, as appropriate. For instance, a virtual peripheral device may update its operating parameters by downloading new parameters from another virtual peripheral device through the communications network 400. Communication between the virtual peripheral devices may be virtualized or simulated.

The virtual peripheral devices may advantageously be operable and/or controllable from the video management system. For instance, they may be turned on/off from the video management system and/or controlled from the video management system. Such control may consist in choosing one or more parameters from the video management system or from a management device for operating the virtual peripheral device in the dynamic 3D virtual environment.

The virtual data streams and/or signals may be recorded in real-time in a recording server 320 which will be described below with reference to FIG. 1.

The video system 10 may also advantageously include one or more physical peripheral devices 500, which communicate with the video management system and/or the dynamic 3D virtual environment (optionally, through the video management system). Examples of such physical peripheral devices 500 include devices configured to interact with the dynamic 3D virtual environment, for instance an access control device which is configured to open or close doors in the virtual world, or a smoke detector configured to trigger a fire alarm in the virtual world through the virtual loudspeaker 600. In this way, it is possible to trigger specific events of interest in the dynamic 3D virtual world and/or measure an operator's response time to a particular situation. This allows for instance to test video management system functionality and/or to improve operator training.

It will be contemplated that the data streams and/or signals generated by the physical peripheral devices 500 may be processed and/or used as the virtual data streams and/or signals generated by the virtual peripheral devices 600, 700 described above. For instance, the data streams and/or signals generated by the physical peripheral devices 500 may be input into the video management system 300 via the communications network 400, input to any other appropriate virtual peripheral device (such as to the virtual door access control equipment 700 illustrated in FIG. 1), input to any of the virtual video cameras 100 and/or stored in the recording server 320, and so forth. Further description of the data streams and/or signals generated by the physical peripheral devices 500 is therefore omitted.

The signals and/or data streams generated by the peripheral devices 500, 600, 700 can be segmented into data segments of manageable sizes in order to be stored on recording servers. The data streams can then be retrieved from the recording servers for live or playback streaming for viewing and/or analysis at a client side.

The video management system 300 receives virtual video streams from the virtual video cameras 100 and, optionally, input signals from other sources (as described above with reference to the peripheral devices 500, 600, 700). The video management system may be configured to store the received virtual video streams in a media repository 350, and provides an interface 360 for accessing the live virtual video streams, and to access virtual video streams stored in the media repository 350. The media repository 350 may be a media database or any other suitable storage device for storing media content. The video management system may include a user interface allowing users to view the live virtual videos and/or store virtual videos and/or to control operation of one or more of the virtual video cameras.

The video management system 300 may be embodied as a software program executed by a suitable data processing system, e.g. by one or more computers, each having one or more processors, and preferably by one or more server computers, each having one or more processors. For instance, the video management system may be the XProtect (RTM) software program developed by Milestone Systems (RTM).

The video management system may comprise one or more camera drivers 310 for providing interfaces to respective types of virtual video cameras. Different virtual video cameras may provide their virtual video streams in different formats, e.g. using different encoding schemes and/or different network protocols. Similarly, different virtual video cameras may provide different interfaces for video camera control such as zoom, tilt or pan. Accordingly, the video management system 300 may include a plurality of different camera drivers 310 configured to cooperate with respective virtual video camera types. In particular, the camera drivers 310 may implement one or more suitable network protocols and/or other communications standards for communicating with virtual video cameras and/or other surveillance equipment. Examples of such protocols and standards include the Open Network Video Interface Forum (ONVIF) standard and the Real Time Streaming Protocol (RTSP). It will be appreciated that the camera drivers 310 may be simulated and/or virtualized as appropriate, to simulate as well as possible a system that would observe a real dynamic environment. In this way, the VMS operator can use or configure the VMS as in real life conditions. This also improves operator training.

The camera drivers 310 further add one or more time stamps to the received virtual video streams 101 so as to ensure that the virtual video streams, which are stored and subsequently supplied by the video management system, include a uniform time stamp. The added time stamp will also be referred to as a canonical time stamp. The canonical time stamp is indicative of the time of receipt, by the video management system, of the virtual video streams 101 from the respective virtual video cameras 100. The camera drivers thus provide uniformly time-stamped input virtual video streams 311, each time-stamped input virtual video stream 311 corresponding to a respective one of the received virtual video streams 101.

The video system 10 or video management system 300 may advantageously comprise a recording server 320. The recording server may be embodied as a software program module executed by a suitable data processing system, e.g. by one or more server computers. The recording server receives the input virtual video streams 311 originating from the respective virtual video cameras 100 from the corresponding camera drivers 310. The recording server stores the received input virtual video streams in a suitable media storage device, such as a suitable media database. It will be appreciated that the media repository 350 may be part of the video management system 300 or it may be separate from, but communicatively coupled to the video management system. The media repository 350 may be implemented as any suitable mass storage device, such as one or more hard disks or the like. The storing of the received input virtual video streams is also referred to as recording the received input virtual video streams. The recording server may receive additional input signals. The additional input signals may originate from the virtual video cameras 100 and/or from the peripheral devices 500, 600, 700 and/or from any additional monitoring or surveillance sensors. The video management system may store the additional input signals in the media repository 350 and/or in a separate storage device.

The recording server 320 may further be configured to selectively provide the live input virtual video streams 311 and/or previously stored input virtual video streams retrieved from the media repository 350 via a suitable interface 360 to one or more of the peripheral devices 500, 600, 700, respectively (as described above).

To this end, the interface 360 may provide a network interface for providing live virtual video streams and/or previously stored virtual video streams via a communications network 400 to one or more peripheral devices 500, 600, 700, such as cloud-based peripheral devices. To this end, the interface 360 may be configured to establish respective video tunnels and/or other communications sessions with the peripheral devices 500, 600, 700. The interface 360 may implement one or more suitable network protocols and/or other communications standards for communicating with other surveillance equipment. Examples of such protocols and standards include the Open Network Video Interface Forum (ONVIF) standard and the Real Time Streaming Protocol (RTSP).

Optionally, the interface 360 may implement different communications channels to other types of external entities. Examples of external entities include a video-receiving system (not shown), which may receive virtual video streams and provide functionality for viewing and/or processing the virtual video streams. Other examples of external entities include a video analytics system, which may receive virtual video streams and perform virtual video processing for analysing the virtual video streams. To this end, the video analytics system may perform object detection, object recognition, facial recognition, motion detection and/or other types of video analytics. The video analytics system may create video metadata indicative of the results of the video analytics performed. For example, the video analytics systems may create video metadata indicative of recognized objects in a virtual video stream. The metadata may include information about the spatial and temporal positions of recognised objects in the virtual video stream and/or information about the identity of the recognized object. The analytics systems may store the generated metadata in a suitable metadata repository. In some embodiments, the analytics systems may communicate the generated metadata back to the video management system. The video management system may store the returned metadata in a suitable metadata repository 340, such as a suitable metadata database, which may be separate from or integrated into the media repository 350. To this end, the video management system may include an index server 330. The index server may be embodied as a software program module executed by a suitable data processing system, e.g. by one or more server computers. The index server may receive metadata and store the received metadata in the metadata repository 340. The index server may further index the stored metadata so as to allow faster subsequent search and retrieval of stored metadata. Metadata received from the external analytics systems may be received by the recording server 320 and forwarded to the index server 330. Alternatively or additionally, the index server may receive metadata directly from one or more analytics systems.

The interface 360 may implement different types of interfaces. For example, the interface may provide an application interface, e.g. in the form of a software development kit and/or one or more communication protocols, such as a suitable messaging protocol, e.g. SOAP, XML, etc. Accordingly, the interface may operate as a gateway to different types of systems.

The communications network 400 may be the internet or another suitable communications network. It will be appreciated that at least some of the physical peripheral devices 500 may reside on the same data processing system as the video management system or on a data processing system connected to the video management system via a local area network, instead.

Figure 2:
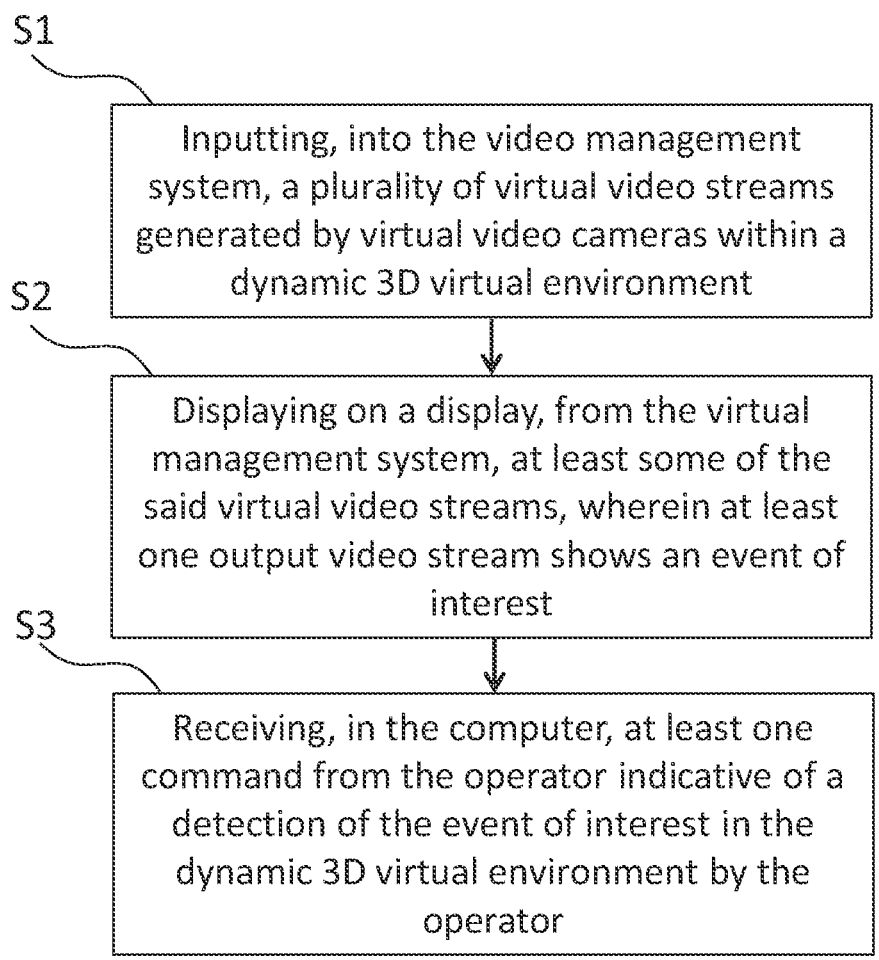
FIG. 2 is a flowchart illustrating the steps of the computer implemented method of training an operator of a video management system according to one or more aspects of the present disclosure.

FIG. 2 is a flowchart illustrating a computer implemented method according to the present disclosure, which comprises three essential steps. The method comprises, in a first step S1, inputting, into the video management system, a plurality of virtual video streams generated by virtual video cameras within a dynamic 3D virtual environment as described above.

Within the context of the present disclosure, the term "dynamic 3D virtual environment" should be understood as meaning a computer-generated environment comprising virtual objects such as virtual people, animals, vehicles, and/or any other simulated property, with variable changing conditions and/or variable changing objects. The changing conditions may for instance be related to the weather and/or lighting conditions, e.g. day and night simulations. The changing objects may for instance be related to a number and/or a behaviour of the objects. For instance, it is possible to populate the dynamic 3D virtual world with dynamic models of humans, animals and/or vehicles. As an example, it is possible to simulate different scenarios and/or events of interest such as people loitering and/or theft in a shopping mall. Another example would be to simulate a car going in the wrong direction on a freeway, since such a situation is difficult to simulate in the real world for training purposes. Accordingly, the disclosure allows to set up and test a VMS before a building is even built or a full surveillance system is even installed. It also allows to test response procedures of VMS operators for scenarios that would be difficult for any other situations difficult to simulate in the real world such as fires, explosions, and assaults. It further allows to test operators or Artificial Intelligence (AI) systems and their responses in variable changing conditions such as high/medium/low density of people and/or traffic.

The dynamic 3D virtual environment can be generated through the use of an appropriate game engine known to the skilled person such as the Unreal Engine (RTM), the Unity engine (RTM) and/or the Unigine engine (RTM). It will be contemplated that the game engine may comprise any other appropriate engines known to the skilled person, such as a physics engine which will determine how objects collide with each other within the dynamic 3D virtual environment and a rendering engine which will determine how to render textures of objects within the dynamic 3D virtual environment based on, for instance, variable lighting conditions. It will also be contemplated that the realism of the dynamic 3D virtual environment may be enhanced through a machine learning or deep learning model, for instance by inputting the virtual video streams into a convolutional network trained with real-life videos and/or pictures, as described for instance in a 2021 paper titled "Enhancing Photorealism Enhancement" by Richter et al. (https://arxiv.org/abs/2015.04619). It will further be contemplated that the engines may be supplemented with various libraries and/or various 3D models. For instance, 3D animations created with Mixamo (RTM) and customized with Adobe Fuse (RTM), and/or computer-generated objects generated with Blender (RTM), may be integrated into the game engine. Various 3D models and/or environments may also be obtained from the Unreal Marketplace. It will further be contemplated that the dynamic 3D virtual environment may be configured to change based on external input received by the computer, for instance from an operator or a trainer of an operator. For instance, a scenario or event of interest can be triggered or pushed into the dynamic 3D virtual environment by any appropriate API such as the REST API or gRPC. The dynamic 3D virtual environment may also change based on a simulation-centric algorithm, which may be added to the dynamic 3D virtual environment or the video management system. In all of the above-mentioned cases, it may be advantageous to measure an intervention time representing a time elapsed between the triggering of the event of interest and the receiving of the command. It thus becomes possible to evaluate if the operator reacts too slowly (or even too quickly), or if they react at all in case of a false alarm corresponding to the event of interest (if, for example, they have interrupted a fire alarm in the presence of a fire) while they should have done something else.

Each virtual video camera may capture what is in front of it by its location, rotation and field-of-view, just like a real-world camera. Each video feed can then be received outside the virtual environment as if the video was recorded by physical video cameras. From a video management system perspective, the video received from the dynamic 3D virtual environment is not distinctly different from a video originating from a regular video camera.

The method also comprises, in a second step S2, displaying on a display, from the virtual management system, at least some of the said virtual video streams, wherein at least one output video stream shows an event of interest.

The method also comprises, in a third step S3, receiving, in the computer, at least one command from the operator indicative of a detection of the event of interest in the dynamic 3D virtual environment by the operator.

The received command may represent a change in a setting of at least one of the virtual video cameras whose virtual video stream observes the event of interest. For instance, the received command may correspond to an instruction to zoom in or out in a virtual video stream so as to better display the event of interest. Similarly, the received command may also correspond to an instruction to move a virtual camera's field of view or the like, such as changing a virtual camera's pan or tilt, or to an instruction to change a virtual camera's resolution. It will be contemplated that the received command may also correspond to or be indicative of an instruction to display on the display another virtual video stream showing the event of interest, so as to display the event from two angles.

The present disclosure also provides a non-transitory computer readable storage medium storing a program for causing a computer to execute a computer implemented method for training an operator of a video management system according to any one of the above-mentioned embodiments and examples.

The present disclosure also provides an apparatus for training an operator of a video management system, comprising a display 250, a video management system 300 and a computer having at least one processor configured to input, into the video management system, a plurality of virtual video streams generated by virtual video cameras within a dynamic 3D virtual environment; display on a display, from the virtual management system, at least some of the said virtual video streams, wherein at least one output video stream shows an event of interest; receive, in the computer, at least one command from the operator indicative of a detection of the event of interest in the dynamic 3D virtual environment by the operator.

Advantageously, this apparatus can consist in a client device as mentioned above or consist in a combination of different electronic devices.

Thus, the various embodiments of the present disclosure allow an operator to test or improve new functionality of a video management system, to train configurators of video management systems to efficiently configure a VMS for a concrete environment and to train VMS operators to act appropriately in atypic situations as in situations or scenarios involving alarms and catastrophes.

While the present disclosure has been described with reference to exemplary embodiments, the scope of the following claims are to be accorded the broadest interpretation so as to encompass all such modifications and equivalent structures and functions.

The invention claimed is:

1. A computer implemented method of training an operator of a video management system, the method comprising:
   inputting, into the video management system, a plurality of virtual video streams generated by virtual video cameras within a dynamic 3D virtual environment;
   displaying on a display, from the virtual management system, at least some of the said virtual video streams, wherein at least one output video stream shows an event of interest;
   receiving, in the computer, at least one command from the operator indicative of a detection of the event of interest in the dynamic 3D virtual environment by the operator;
   determining, by the video management system, an intervention time representing a time elapsed between the triggering of the event of interest and the receiving of the command; and
   evaluating the operator based on the determination of the intervention time and the event of interest.

2. The method of claim 1, wherein the received command represents a change in a setting of at least one of the virtual video cameras whose virtual video stream observes the event of interest.

3. The method according to claim 2, wherein the setting defines a resolution, field of view, pan, tilt and/or zoom of the said at least one virtual video camera.

4. The method according to claim 1, further comprising inputting at least one virtual data stream generated by a virtual peripheral device within the dynamic 3D virtual environment into the video management system and outputting on the display, from the video management system, at least one virtual data stream and/or at least one alert, alarm and/or message based on the at least one virtual data stream input into the video management system and corresponding to the event of interest.

5. The method according to claim 4, wherein the received command is indicative of an instruction to turn off the at least one alert, alarm and/or message output from the virtual management system.

6. The method according to claim 1, wherein the received command is indicative of an instruction to display on the display another virtual video stream showing the event of interest.

7. The method according to claim 1, further comprising inputting at least one data stream generated by a physical peripheral device into the video management system and outputting on the display, from the video management system, at least one data stream and/or at least one alert, alarm and/or message based on the at least one data stream input into the video management system and corresponding to the event of interest.

8. The method according to claim 1, wherein the dynamic 3D virtual environment changes based on external input received by the computer.

9. The method according to claim 8, wherein a trainer of the operator observes the operator and triggers the event of interest based on an observation of the operator.

10. The method according to claim 1, wherein the dynamic 3D virtual environment is configured to change based on at least one simulation-centric algorithm.

11. The method according to claim 1, wherein lighting conditions change within the dynamic 3D virtual environment.

12. The method according to claim 1, wherein the dynamic 3D virtual environment comprises dynamic models of humans, animals and/or vehicles.

13. The method according to claim 12, wherein the event of interest involves a change in behaviour of at least one of the said humans, animals and/or vehicles.

14. The method according to claim 13, wherein the event of interest further involves a change in a number of the said humans, animals and/or vehicles.

15. The method according to claim 14, wherein the event of interest is triggered by a trainer of the operator.

16. The method according to claim 1, wherein at least one virtual video stream is input into a machine learning model trained with real-life videos and/or pictures, the method further comprising outputting from the model an enhanced virtual video stream and inputting the enhanced virtual video stream into the video management system.

17. The method according to claim 1, further comprising recording and storing in a video repository at least one sequence from at least one virtual video stream of the plurality of virtual video streams and accessing by the operator the sequence through the virtual management system.

18. A non-transitory computer readable storage medium storing a program for causing a computer to execute a computer implemented method of training an operator of a video management system, the method comprising:
- inputting, into the video management system, a plurality of virtual video streams generated by virtual video cameras within a dynamic 3D virtual environment;
- displaying on a display, from the virtual management system, at least some of the said virtual video streams, wherein at least one output video stream shows an event of interest;
- receiving, in the computer, at least one command from the operator indicative of a detection of the event of interest in the dynamic 3D virtual environment by the operator;
- determining, by the video management system, an intervention time representing a time elapsed between the triggering of the event of interest and the receiving of the command; and
- evaluating the operator based on the determination of the intervention time and the event of interest.

19. An apparatus for training an operator of a video management system, comprising a display, a video management system and a computer having at least one processor configured to:
- input, into the video management system, a plurality of virtual video streams generated by virtual video cameras within a dynamic 3D virtual environment;
- display on a display, from the virtual management system, at least some of the said virtual video streams, wherein at least one output video stream shows an event of interest;
- receive, in the computer, at least one command from the operator indicative of a detection of the event of interest in the dynamic 3D virtual environment by the operator;
- determine, by the video management system, an intervention time representing a time elapsed between the triggering of the event of interest and the receiving of the command; and
- evaluate the operator based on the determination of the intervention time and the event of interest.

* * * * *